(12) United States Patent
Hart et al.

(10) Patent No.: US 7,328,650 B2
(45) Date of Patent: Feb. 12, 2008

(54) BREWER

(75) Inventors: Burton L. Hart, Auburn, IL (US); Raymond N. Wenda, Petersburg, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 10/682,642

(22) Filed: Oct. 9, 2003

(65) Prior Publication Data

US 2004/0103791 A1    Jun. 3, 2004

Related U.S. Application Data

(60) Provisional application No. 60/417,336, filed on Oct. 9, 2002.

(51) Int. Cl.
*A47J 37/00* (2006.01)
(52) U.S. Cl. .............................. 99/290; 99/291; 99/306; 222/129.1; 222/146.2
(58) Field of Classification Search ................... 99/290, 99/291, 279, 304, 307, 306; 222/129, 129.1, 222/146.2, 146.5
See application file for complete search history.

(56) References Cited

U.S. PATENT DOCUMENTS

| 4,621,571 A | * | 11/1986 | Roberts | 99/280 |
| D328,995 S | | 9/1992 | Verheijen | D7/309 |
| D332,027 S | | 12/1992 | Verheijen | D7/308 |
| 5,285,718 A | * | 2/1994 | Webster et al. | 99/290 |
| 5,862,738 A | * | 1/1999 | Warne | 99/281 |

\* cited by examiner

*Primary Examiner*—Reginald L. Alexander
(74) *Attorney, Agent, or Firm*—Barnes & Thornberg LLP

(57) ABSTRACT

Disclosed is a beverage dispenser of the type for dispensing beverage into a server. The dispenser includes a housing having a body and an overhanging portion protruding from the housing. A dispensing area is defined between the overhanging portion of the body. The housing is configured for dispensing beverage therefrom. An extension is provided protruding from the body of the housing into the dispensing area. The extension is positioned proximate to an area which retains at least one server in the dispensing area. A void is defined in the dispensing area between the extension and the overhanging portion. The void helps facilitate ease of access to the dispenser and server as well as facilitating ease of access to the servers, removal and replacement of the servers as well as maintenance, repair, operation and other aspects of the dispenser.

24 Claims, 2 Drawing Sheets

BREWER

This application claims the benefit of U.S. Provisional Application No. 60/417,336 filed Oct. 9, 2003.

BACKGROUND

The present disclosure relates to a system and apparatus for producing and dispensing beverages.

There are numerous types of beverage dispensers that may benefit from the present disclosure, for example, coffee brewers, tea brewers or beverage concentrate dispensers. More particularly, any beverage dispenser that produces more than one beverage from different outlet ports or produces one beverage from multiple outlet ports may benefit from the present disclosure.

Beverage dispensers such as those mentioned above may be constructed with an overhanging portion which protrudes horizontally from an upper portion of a main structure or body of the beverage dispenser. The overhanging portion contains one or more outlet ports from which a beverage is dispensed.

Briefly, a system and apparatus for producing beverages is disclosed having a brewer with an intermediate structure or an extension portion located generally near a midline of the of the brewer under an overhanging portion. The extension portion is dimensioned such that it rises only a portion of the distance from a bottom surface of the brewer to the overhanging portion defining a void therebetween, thus allowing improved access to the area beneath the overhanging portion. The extension portion as disclosed, also includes a faucet protruding from the extension.

Additional features will become apparent to those skilled in the art upon consideration of the following detailed description of drawings, illustrative of at least one embodiment of the disclosure.

BRIEF DESCRIPTION OF THE DRAWINGS

The detailed description particularly refers to the accompanying figures in which.

DETAILED DESCRIPTION OF THE DRAWINGS

Figure 1:
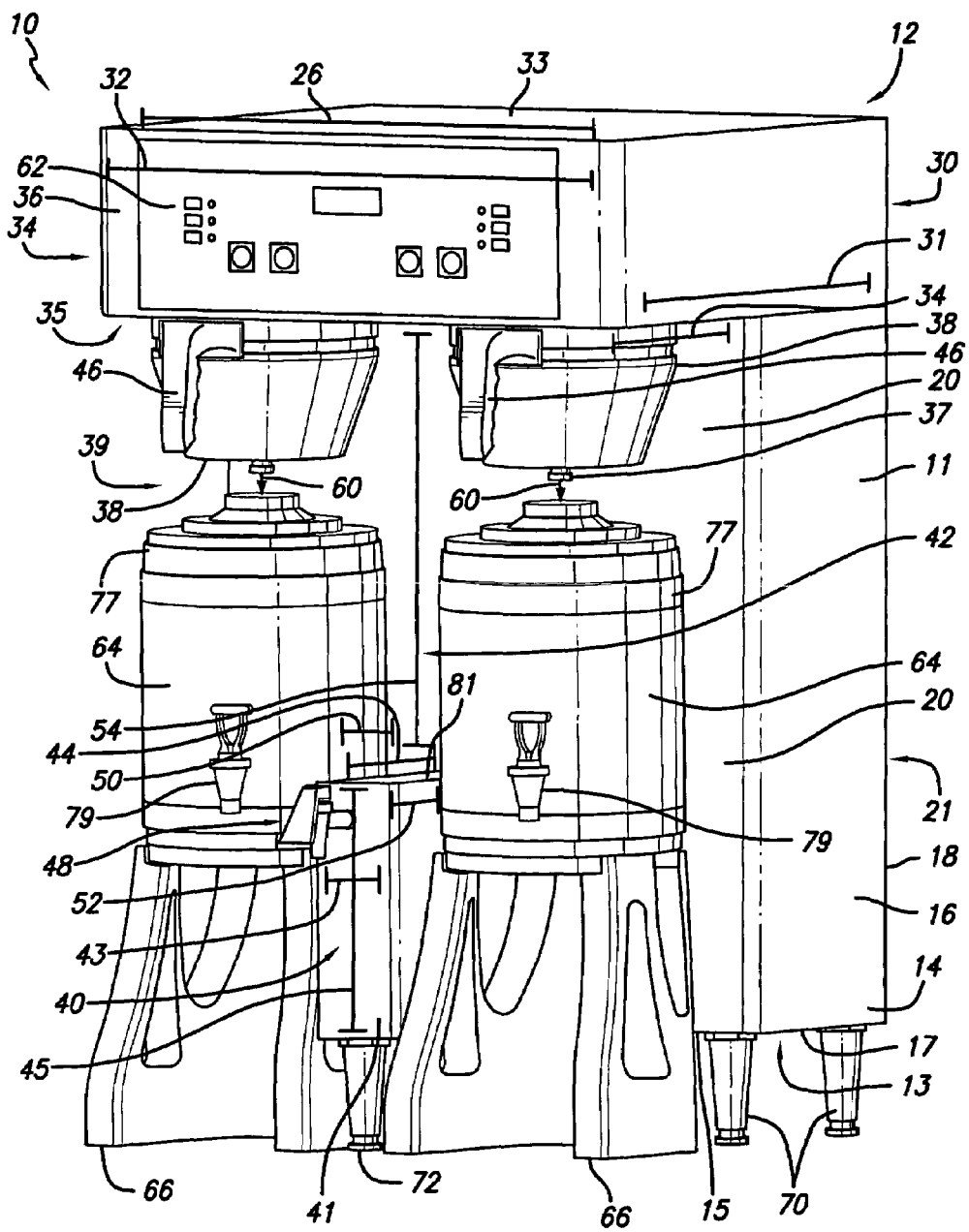
FIG. 1 is a diagrammatic perspective view of a dispenser.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Terms including brewed, brewing, brewing substance, brewing liquid, beverage, and brewed beverage as used herein are intended to be broadly defined as including but not limited to the brewing of coffee, tea and any other brewed beverage. This broad interpretation is also intended to include, but is not limited to any process of dispensing, infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

With reference to the figures, a beverage making system or dispenser or brewer 10 is shown in FIG. 1. The brewer 10 generally is an apparatus for brewing or otherwise producing beverages, such as a coffee brewer. An exterior of the brewer 10 is defined by a housing 12. The housing 12 defines an interior cavity containing components and equipment for use in making beverages. In one embodiment the housing 12 is formed of stainless steel, however any suitable material known to those of skill in the art may be employed. Generally, the housing combination with funnels 38 as described below and other structures operates to dispense beverage 60 from the brewer 10 in a generally known manner.

The housing 12 is generally comprised of a base 13, a pair of side walls 16, a front wall 20, a rear wall 21, a top 22, an overhang portion 30, and an extension portion 40. The base 14 is a generally rectangular planar horizontal structure having a pair of short sides 14 and a pair of long sides 15. While a generally rectangular structure is disclosed, a variety of other geometric shapes may be employed which serve the same function without departing form the scope of the present disclosure. The housing 12 includes two general portions, namely a body 11 from which the overhang portion 30 extends. The relationship of the body and overhang portion 30 will be described in greater detail herein below.

As illustrated, each side wall 16 is of also of generally rectangular shape having a pair of short sides 17 and a pair of long sides 18 and are roughly identical shape. The short sides 17 of side walls 16 are roughly the same length as the short sides 14 of base 13. One of the short sides 17 of each side wall 16 is welded or otherwise fastened to a corresponding short side 14 of the base 13. The side walls 16 are fastened to the base 13 to form roughly a right angle relative to base 13, thereby placing the side walls 16 in generally vertical alignment. While the fastening means disclosed in one embodiment is welding, other fastening means such as machine screws, rivets, adhesives or other suitable fastening means known to those of skill in the art may be employed.

Rear wall 21 is dimensioned to be generally the same height as the long side of side walls 16 and generally the same width as the long side 15 of base 13. One of the sides of the rear wall 21 having generally the same width dimension as the long side 15 of base 13 is fastened to one of the long sides 15 of base 13. Rear wall 21 is fastened to the base 13 in a vertical orientation generally forming a right angle. The rear wall 21 also engages one of the long sides 18 of both side walls 16 at generally right angles and is fastened thereto.

The front wall 20 is also roughly the same height as the long sides 18 of side walls 16 and generally the same width of the long side 15 of base 13. A surface of the front wall 20 having generally the same width as the long side 15 of the base 13 is attached to the long side 15 of base 13 opposite the long side 15 where rear wall 21 is attached. The front wall 20 also engages one of the long sides 18 of both side walls 16 at generally right angles The side walls 16, rear wall 21 and front wall 20 all terminate at generally the same height above the base 13 forming a generally planar surface.

An overhanging portion or overhang 30 is dimensioned to include two long sides 32 and two short sides 31. The short sides 31 are generally twice as long as short sides 14 of base 13, while the long sides 32 are generally equal to the length of the long sides 15 of base 13. Overhang 30 is fastened to the uppermost surfaces of side walls 16, rear wall 21 and front wall 20 where they terminate. A top 33 is provided on overhang 30 and is fastened to the side opposite the side which attaches to the terminal portions of side walls 16, rear wall 21 and front wall 20. The overhang 30 is fastened to rear wall 21 and side walls 16 so as to continue a vertical planes formed by rear wall 21 and side walls 16 until the planes terminate at top 33. The front wall 20 however is interrupted by overhang 30 which extends horizontally beyond a vertical plane established by front wall 20 roughly the distance of the short side 14 of base 13 thus forming a cantilevered portion 34. It should be noted that the cantilevered or overhanging portion 34 may be a "hood" type of structure as shown in the figures or may include other variations of such structures such as separate funnels or funnel supporting structures or other forms of dispensing structures generally extending from the body 11.

The cantilevered portion 34 has a front portion 36 and an underside portion 35. The front portion 36 rises vertically from the underside portion 35 to engage the top 22 and may contain a control panel 62. The underside portion 35 may have retaining structure 83 such as funnel retaining rails of known construction for removably retaining funnels 38. Each funnel 38 will receive brew water from a corresponding outlet aperture or sprayhead of known construction which is generally located above funnels 38 for producing a beverage 60. While one embodiment discloses funnels 38, the present disclosure may be utilized with or without funnels 38 depending on the method of dispensing beverage from the system.

A beverage dispensing area 39 is defined by the area below the cantilevered portion 34. The beverage dispensing area 39 may receive beverage servers 64. In one embodiment a beverage server 64 is placed under each funnel 38 for receiving beverage 60. The beverage servers 64 may take the form of any container capable of holding a beverage. In one embodiment, the beverage servers 64 are placed in bases 66 which may be removable or permanently attached to the server. The bases 66 hold the beverage servers 64 in a position proximate to outlet aperture 37 of funnels 38, thereby minimizing the distance beverage 60 must travel to enter beverage server 64. The bases 66 also elevate the beverage servers 64 a desired distance above a surface to allow a cup or other container to be placed below the server 64 for dispensing into such a container. Faucets 79 are provided on each of the servers to facilitate dispensing of beverage from the servers 64. The faucets 79 on the servers and the faucet 48 on the extension 40 are positioned at approximately the same level.

The beverage dispensing area 39 area under the cantilevered portion 34 is effectively divided into two generally equal portions by an extending portion or intermediate structure 40. Extension 40 protrudes from front wall 20 into beverage dispensing area 39 at generally a midpoint along long side 15 of base 13. Extension 40 is a generally rectangular structure defined by at least one wall 41. The extension as shown in the Figures also includes a top 81 generally extending along the top of the wall 41. A first horizontal dimension 43 and extending horizontally a second horizontal dimension 44 into beverage dispensing area 39 from front wall 20. The second horizontal dimension 44 is a distance approximately equal to the distance cantilevered portion 34 extends beyond front wall 20. Extension 40 extends a vertical dimension 45 into beverage dispensing area 39 in an upward direction from base 13 towards cantilevered portion 34 without engaging cantilevered portion 34, thus defining a void 42. The void 42 generally has a first horizontal dimension 50 between the servers 64, second horizontal dimension 52 from the wall 20 to the front of the extension 40 and vertical dimension 54 between the top of the extension 40 up to the cantilevered portion 34.

Figure 2:
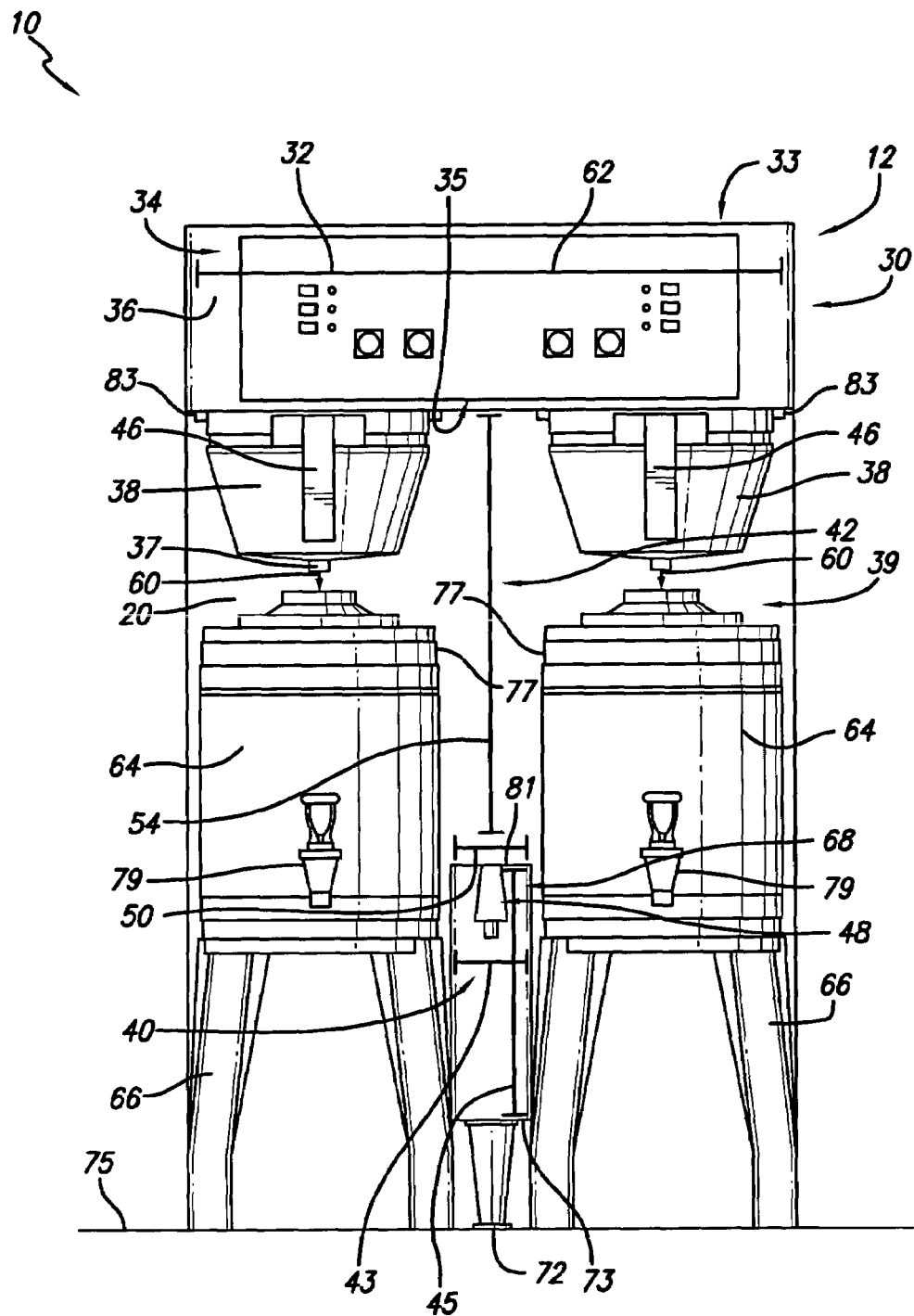
FIG. 2 is a front diagrammatic elevational view of the dispenser shown in FIG. 1.

While the present disclosure discusses one extension 40 any number of extensions may be employed without departing form the scope of the present disclosure. For example, if the brewer 10 were to have three funnels 38 below three outlet apertures, it may be desirable to have two extensions 40. The presence of two extensions 40 would divide the beverage dispensing area 39 into three roughly equal sized distinct areas where beverage servers 64 may be located. It should also be noted that a single brewing station may be used in conjunction with the extension 40. In this configuration, the dispenser 10 would include a single brewing unit or dispensing unit positioned next to the extension 40. This may be useful in the situation in which the device is positioned to or butts a wall or other device or structure and in which two dispensing or brewing stations are not needed. This configuration having a single brewing station would provide the benefit of the present system and apparatus as illustrated in FIGS. 1 and 2 showing two brewing stations. A single brewing station is fully within the scope of the present application.

In one embodiment, the extension 40 extends upward from base 13 approximately ⅓ the distance from the base 13 to the cantilevered portion 34, leaving the vertical dimension 54 of the void 42 approximately equal to ⅔ the distance from base 13 to cantilevered portion 34. In other words, the generally vertical dimension 54 is approximately twice the generally vertical dimension 45 defined along the front of the extension 40.

While the present disclosure described a void 42 having particular dimensions, a variety of first horizontal dimensions 50, second horizontal dimensions 52 and vertical dimensions 54 may be employed without departing from the scope of the present disclosure. For example, the extension 40 may extend beyond the front portion 36 of the cantilevered portion 34. The extension 40 may also have a vertical dimension 45 greater or less than that discussed in the present disclosure.

One purpose of dimensioning extension 40 to define void 42 as shown in FIGS. 1 and 2 is to allow improved access to both the funnels 38 and the beverage servers 64. As seen in FIG. 2, two beverage servers 64 are located on opposite sides of extension 40. Extension 40 is dimensioned such that only a portion of the extension is proximate to a bottom portion of beverage server 64. This configuration leaves a substantial portion of the beverage servers accessible in the area adjacent to and extending into the void 42. Additionally, the void 42 between the two funnels 38 leaves the entire area of the funnels 38 accessible. The improved accessibility may make removal of the beverage servers 64 and the funnels 38 easier and more convenient.

For example, after a brew cycle has completed and beverage 60 has been dispensed into the beverage server 64, a user may wish to move the filled beverage server 64 from the beverage dispensing area 39 to a remote location for dispensing the beverage 60. In order to do so, a user must manually remove the beverage server 64, which is now heavier due to the beverage 60 contained therein, from the beverage dispensing area 39. For example a full 1½ gallon container, including the container body, base and beverage may weigh 16 lbs. or more. To accomplish the removal, a user must lift the beverage server 64 and base 66 by grasping the beverage server 64.

The void 42 allows a user to grasp the beverage server 64 for example, generally near an upper portion 77 of the server on opposing sides with ease, thus allowing for a more positive grip. Positively gripping the beverage server 64 would be difficult if not impossible if extension 40 extended upwards to the cantilevered portion 34. In one embodiment, the first horizontal dimension 50 of the void 42 is of such a distance that a user may easily insert a hand between the two beverage servers 62. Grips or handles may be provided on the servers 64 to further facilitate grasping and moving the servers 64. The grips or handles may extend into the void without interference from the extension 40.

As can be seen in FIG. 2, the first horizontal dimension 50 is substantially larger than the nominal gap 68 which exists between extension 40 and a lower portion of beverage server 62 prior to an upper termination of extension 40. This nominal gap 68 generally may not afford adequate room for manually grasping the beverage server with a positive grip. Additionally, the second horizontal dimension 52 being generally equal to the distance the cantilevered portion 34 extends beyond the front wall 20, may allow a user to reach substantially behind a beverage server 62. Finally, the vertical dimension 54 is of such a size so as to allow a user access to substantially an entire length of a beverage server 64. Essentially, the present disclosure provides a user with access to substantially all of a vertical surface of the beverage server 64 while it is located within the beverage dispensing area 39

As an additional consideration, the void 42 may allow for the use of a beverage server 62 having handles disposed on opposite sides. Without the void 42, a beverage server 62 having handles may not be a workable option because there might not be sufficient space for a handle between the beverage server 62 and the extension 40.

The void 42 also provides for easier access to the funnels 38. In the present disclosure, the funnels 38 are provided with handles 46. However, handles 46 may be provided in different locations or may not be provided with all funnels 38. In such a case where no handle is provided, a user may be required to grasp the funnel 38 about its circumferential dimension in a similar manner as described above for the beverage servers 64. Further, the void 42 provides easy access to an area proximate to funnel 38. Easy access to such an area may be desired for maintenance functions such as cleaning, repairing or other activities.

In any case, tasks requiring access to the funnel 38, the beverage server 64, or the underside portion 35 of the cantilevered portion 34 may be performed more efficiently with the access provided by void 42.

An additional function provided by the position and dimension of extension 40 is added support for the brewer 10, without diminishing access to the beverage servers 64 and funnels 38. As seen in FIG. 1, legs 70 are provided on base 13. In one embodiment, four legs 70 are provided on the base 13 in order to raise the brewer 10 above the surface on which it is placed. The legs are disposed, each on one of the four intersections of short side 14 and long side 15. This arrangement of legs 70 stabilizes the brewer 10, having a generally rectangular base 13. In another embodiment, the extension 40 provides a location for mounting an additional leg or foot 72. The additional leg 72 allows for the weight of the brewer 10 to be distributed more evenly and over a greater area. The foot or leg 72 is positioned on a bottom portion 73 of the extension 40. The foot 72 spaces the bottom 73 off of the surface 75 on which the dispenser is positioned. While five legs are discussed in the present disclosure, any number and orientation of legs is contemplated. For example, two or more additional legs 71 may be provided on the extension 40. Also, the four legs 70 provided on the base may be increased or decreased in number or relocated without departing from the scope of the present disclosure.

Yet another feature provided by the extension 40 is a point for delivery of hot or cold water from a water delivery system. A serving valve faucet 48 may be provided on extension 40. Serving valve 48 communicates with water distribution lines in the interior of the brewer 10 which supply heated, ambient temperature or chilled water. While one valve 48 is shown in the figures, multiple valves 48 could be provided. Such valves 48 could be arranged in side-by-side orientation or on separate extensions, as in the case of a system having multiple extensions, such as a three server system. The serving valve 48 may be located at any height on the extension 40 and is generally located at a height sufficiently above base 13 to allow a container to be placed under serving valve 48 for filling the container. The serving valve or faucet 48 may be of any type of known construction for controllably dispensing water or any other liquid or product therefrom. Such faucets 48 include mechanical, hydraulic, electrical or any other form of operating device for controllably dispensing.

While an embodiment has been illustrated and described in the drawings and foregoing description, such illustrations and descriptions are considered to be exemplary and not restrictive in character, it being understood that only an illustrative embodiment has been shown and described and that all changes and modifications that come within the spirit of the invention are desired to be protected. The applicant has provided description and figures which are intended as an illustration of certain embodiments of the disclosure, and are not intended to be construed as containing or implying limitation of the disclosure to those embodiments. There are a parality of advantages of the present disclosure arising from various features set forth in the description. It will be noted that alternative embodiment of the disclosure may not include all of the features described yet still benefit from at least some of the advantages of such features. Those of ordinary skill in the art may readily devise their own implementations of the disclosure and associated methods that incorporate one or more of the feature of the disclosure and fall within the spirit and scope of the present disclosure as defined by the impendent claims.

The invention claimed is:

1. A beverage dispenser of the type for dispensing beverage into a server, the beverage dispenser comprising:
   a housing including a body and an overhanging portion, the overhanging portion extending from the body and defining a dispensing area therebetween, beverage being dispensed from the housing proximate the dispensing area;
   at least one server being positionable in the dispensing area for receiving beverage dispensed from the housing;
   an extension protruding from the body of the housing in the dispensing area and positioned proximate to the at least one server in the dispensing area;
   the extension further comprising at least one wall, the at least one wall generally positioned proximate to a side of the at least one server and spaced from the overhanging portion, a faucet depending from the extension for controllably dispensing water therefrom; and
   a void being defined in the dispensing area between the extension and the overhanging portion.

2. The beverage dispenser of claim 1, further comprising: a pair of servers positionable in the dispensing area for receiving beverage dispensed from the housing; the extension protruding from the body of the housing in the dispensing area and positioned generally between the servers in the dispensing area; and the void being defined in the dispensing area between an upper portion of the extension, the overhanging portion, and the sides of the servers positioned proximate to the extension.

3. The beverage dispenser of claim 1, further comprising: the void being defined in the dispensing area between an upper portion of the extension, the overhanging portion, and the sides of the servers positioned proximate to the extension with the generally vertical dimension of the void being approximately twice the dimension of a corresponding generally vertical dimension of the extension.

4. The beverage dispenser of claim 1, further comprising: a foot being attached to a bottom of the extension for spacing the extension off of a surface on which the dispenser is positioned.

5. The beverage dispenser of claim 1, further comprising: the void being defined in the dispensing area between an upper portion of the extension, the overhanging portion, and the sides of the servers positioned proximate to the extension with the upper portion of the extension generally spaced from an upper portion of the corresponding server for providing space to permit gripping a side of the server facing the extension without interference from the extension.

6. The beverage dispenser of claim 2, further comprising: each server having a controllable dispensing faucet for controllably dispensing beverage from the server.

7. The beverage dispenser of claim 2, further comprising: each server having a controllable dispensing faucet for controllably dispensing beverage from the server, a faucet depending from the extension for controllably dispensing water therefrom.

8. The beverage dispenser of claim 7, further comprising: controllable dispensing faucets on the servers and the faucet depending from the extension being positioned at generally the same height above a surface on which the dispenser is positioned.

9. The beverage dispenser of claim 1, the extension further comprising the faucet connected to a hot water source for controllably dispensing hot water therefrom.

10. The beverage dispenser of claim 1, the extension further comprising the faucet connected to an ambient water source for controllably dispensing ambient temperature water therefrom.

11. The beverage dispenser of claim 1, the extension further comprising the faucet connected to a cold water source for controllably dispensing cold water therefrom.

12. The beverage dispenser of claim 1, the housing further including a funnel removably retained on the overhanging portion of the housing, beverage being dispensed from the funnel generally in the dispensing area.

13. A method of using a beverage dispensing system, the method comprising the steps of:
providing a housing including a body and an overhanging portion, the overhanging portion extending from the body and defining a dispensing area therebetween;
providing at least one server;
positioning the server in the dispensing area;
dispensing beverage from the housing into the server;
providing an extension substantially protruding from the body of the housing in the dispensing area and positioned proximate to and extending substantially along at least one side of the at least one server in the dispensing area;
providing a foot on the extension, the foot protruding to a surface on which the housing is positioned;
providing a void in the dispensing area defined between the extension and the overhanging portion; and
reaching into the void by a user for at least one of servicing, repairing, operating and maintaining the dispenser.

14. A beverage dispenser of the type for dispensing beverage into a container, the beverage dispenser comprising:
a housing including a body and an overhanging portion, the overhanging portion extending from the body and defining a dispensing area therebetween, beverage being dispensed from the housing proximate the dispensing area;
at least one container being positionable in the dispensing area for receiving dispensed beverage;
an extension protruding from the body of the housing in the dispensing area and positioned proximate to the at least one container in the dispensing area;
a faucet depending from the extension for controllably dispensing liquid therefrom; and
a void being defined in the dispensing area between a top of the extension and a corresponding portion of the overhanging portion.

15. The beverage dispenser of claim 14, further comprising: a foot being attached to a bottom of the extension for spacing the extension off of a surface on which the dispenser is positioned.

16. The beverage dispenser of claim 14, wherein the extension is positioned proximate to at least one side of the container.

17. The beverage dispenser of claim 14, wherein two containers are positionable under the overhanging portion and the extension is generally positioned extending from the body from a position generally between the two containers.

18. A method of using a beverage dispensing system, the method comprising the steps of:
providing a housing including a body and an overhanging portion, the overhanging portion extending from the body and defining a dispensing area therebetween;
providing at least one container for receiving beverage;
positioning the container in the dispensing area;
dispensing beverage from the housing into the container positioned in the dispensing area;
providing an extension protruding from the body of the housing in the dispensing area and positioned proximate to at least one side of the at least one container in the dispensing area, the extension further comprising a foot for support;
providing a void in the dispensing area defined above and between the extension and the overhanging portion;
providing a faucet depending from the extension;
controllably dispensing liquid from the faucet; and
reaching into the void by a user for at least one of servicing, repairing, operating and maintaining the dispenser.

19. A beverage dispenser of the type for dispensing beverage into a container, the beverage dispenser comprising:
a housing including a body and an overhanging portion, the overhanging portion extending from the body and defining a dispensing area thereunder, beverage being dispensed from the housing proximate the dispensing area;

at least one container being positionahie in the dispensing area for receiving dispensed beverage;

at least one extension protruding from the body of the housing in the dispensing area a faucet depending from the extension for controllably dispensing liquid therefrom;

the extension positioned proximate to the at least one container in the dispensing area and providing support to the body; and a void being defined in the dispensing area between a top of the extension and a corresponding portion of the overhanging portion.

20. A beverage dispenser of the type for dispensing beverage into a server, the beverage dispenser comprising:

a housing including a body and an overhanging portion, the overhanging portion extending from the body and defining a dispensing area, at least one funnel being retained in the dispensing area for retaining a beverage making substance, beverage being dispensable from the funnel in the dispensing area, the dispensing area being sized for receiving at least one server for positioning below a corresponding funnel for receiving beverage;

an extension protruding from the body of the housing in the dispensing area and positioned to accommodate the at least one server in the dispensing area along side of the extension;

a top of the extension spaced from the overhanging portion;

a void being defined in the dispensing area between the top of the extension and the overhanging portion; and a foot protruding from a bottom portion of the extension.

21. A beverage dispenser of the type for dispensing beverage into a server, the beverage dispenser comprising:

a housing including a body and an overhanging portion, the overhanging portion extending from the body and defining a dispensing area, at least one funnel being positionable in the dispensing area for retaining a beverage making substance, beverage being dispensable from the funnel in the dispensing area, the dispensing area being sized for receiving at least one server for positioning below a corresponding funnel for receiving beverage;

an extension protruding from the body of the housing in the dispensing area and positioned to accommodate the at least one server in the dispensing area;

a top of the extension spaced from the overhanging portion;

a void being defined in the dispensing area between the top of the extension and the overhanging portion with a generally vertical dimension of the void being approximately twice the dimension of a corresponding generally vertical dimension of the extension.

22. A beverage dispenser of the type for dispensing beverage into a server, the beverage dispenser comprising:

a housing including a body and an overhanging portion, the overhanging portion extending from the body and defining a dispensing area, beverage being dispensable from the housing in the dispensing area, the dispensing area being sized for receiving at least one server for positioning below the overhanging portion for receiving beverage;

an extension protruding from the body of the housing in the dispensing area and positioned to accommodate the at least one server in the dispensing area;

a top of the extension spaced from the overhanging portion;

a void being defined in the dispensing area above and between the top of the extension and the overhanging portion;

at least one server with the dispenser; and each server of the at least one server having a controllable dispensing faucet for controllably dispensing beverage from the server.

23. A beverage dispenser of the type for dispensing beverage into a server, the beverage dispenser comprising:

a housing including a body and an overhanging portion, the overhanging portion extending from the body and defining a dispensing area, beverage being dispensable from the housing in the dispensing area, the dispensing area being sized for receiving at least one server for positioning below the overhanging portion for receiving beverage;

an extension protruding from the body of the housing in the dispensing area and positioned to accommodate the at least one server in the dispensing area;

a top wall of the extension spaced from the overhanging portion;

a void being defined in the dispensing area above and between the top of the extension and the overhanging portion;

at least one server with the dispenser; and each server having a controllable dispensing faucet for controllably dispensing beverage from the server, a faucet depending from the extension for controllably dispensing water therefrom.

24. A beverage dispenser of the type for dispensing beverage into a server, the beverage dispenser comprising:

a housing including a body and an overhanging portion, the overhanging portion extending from the body and defining a dispensing area, beverage being dispensable from the housing in the dispensing area, the dispensing area being sized for receiving at least one server for positioning below the overhanging portion for receiving beverage;

an extension protruding from the body of the housing in the dispensing area and positioned to accommodate the at least one server in the dispensing area;

a faucet depending from the extension;

a top of the extension spaced from the overhanging portion;

a void being defined in the dispensing area above and between the top of the extension and the overhanging portion;

at least one server with the dispenser; and controllable dispensing faucets on the servers and the faucet depending from the extension being positioned at generally the same height above a surface on which the dispenser is positioned.

* * * * *

UNITED STATES PATENT AND TRADEMARK OFFICE
CERTIFICATE OF CORRECTION

| | | |
|---|---|---|
| PATENT NO. | : 7,328,650 B2 | Page 1 of 1 |
| APPLICATION NO. | : 10/682642 | |
| DATED | : February 12, 2008 | |
| INVENTOR(S) | : Hart et al. | |

It is certified that error appears in the above-identified patent and that said Letters Patent is hereby corrected as shown below:

In Column 9, Claim 19, line 4 should read as follows:

--at least one container being positionable in the dispensing--

Signed and Sealed this
Nineteenth Day of July, 2011

David J. Kappos
*Director of the United States Patent and Trademark Office*